Figure 1:
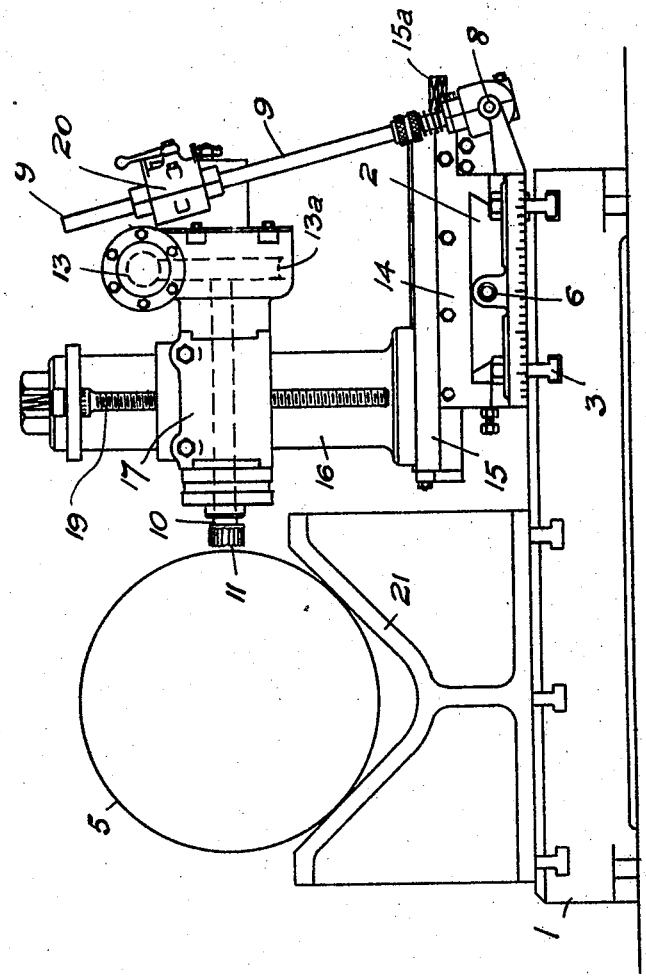

Dec. 23, 1924.

J. W. BARNES 1,520,219

APPARATUS FOR CUTTING INCLINED KEYWAYS IN SHAFTS OR LIKE OPERATIONS

Filed July 2, 1921    3 Sheets-Sheet 1

Inventor
J.W. Barnes
By his attorney
A.J. Davies.

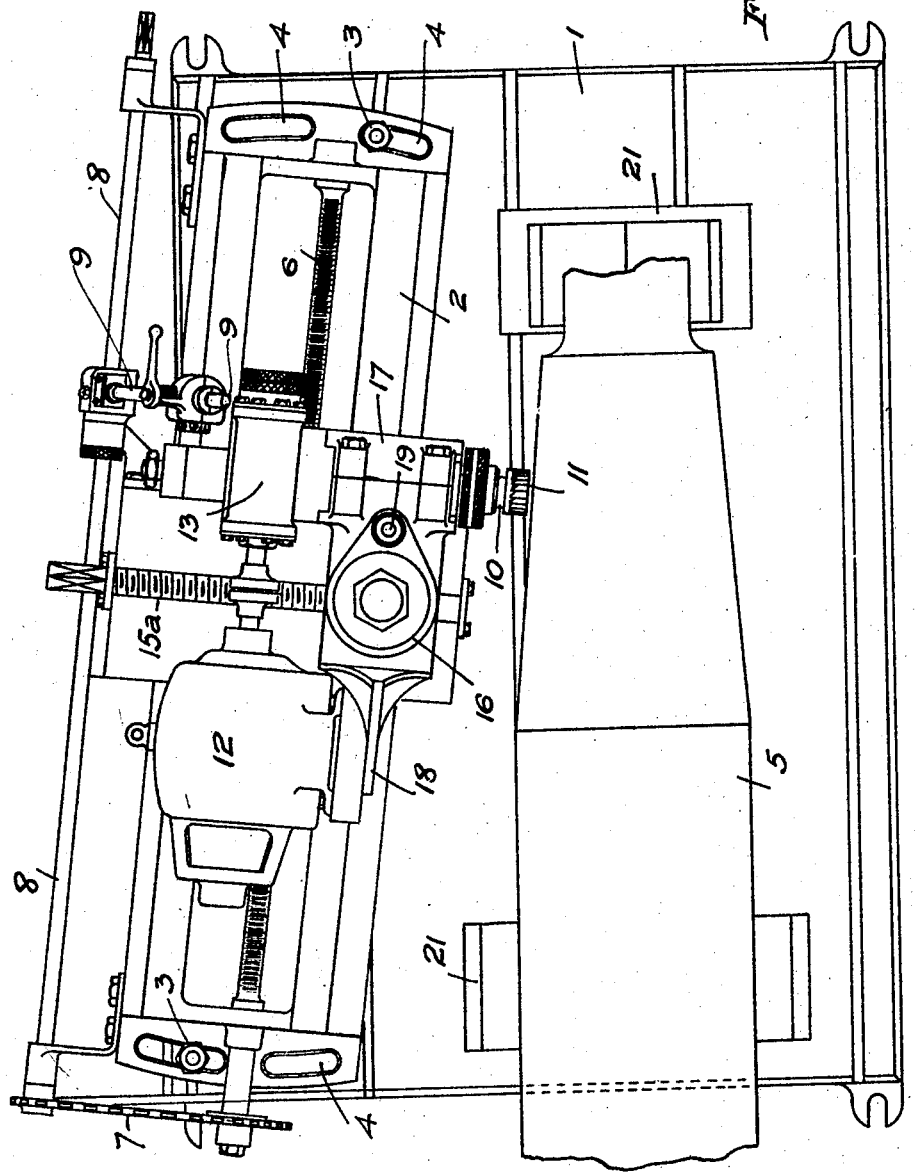

Dec. 23, 1924.  
J. W. BARNES  
1,520,219  
APPARATUS FOR CUTTING INCLINED KEYWAYS IN SHAFTS OR LIKE OPERATIONS  
Filed July 2, 1921  3 Sheets-Sheet 3
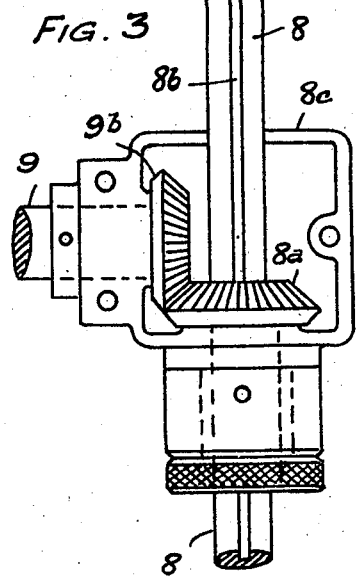
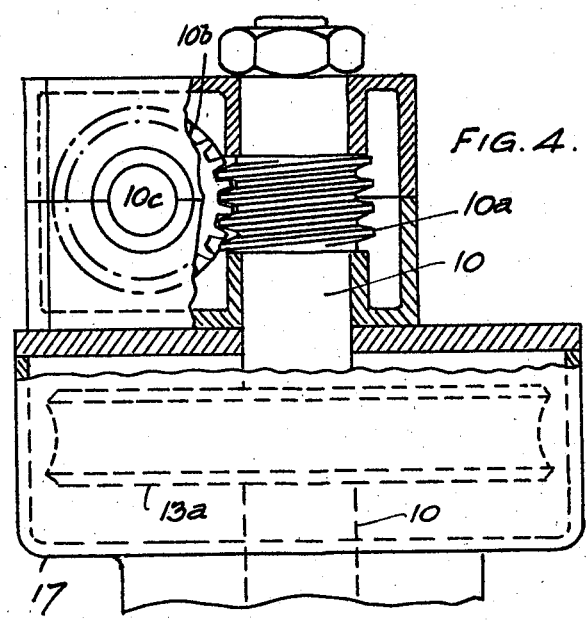
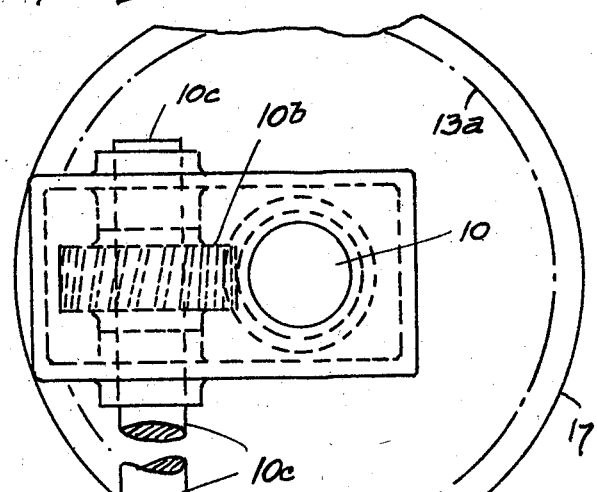
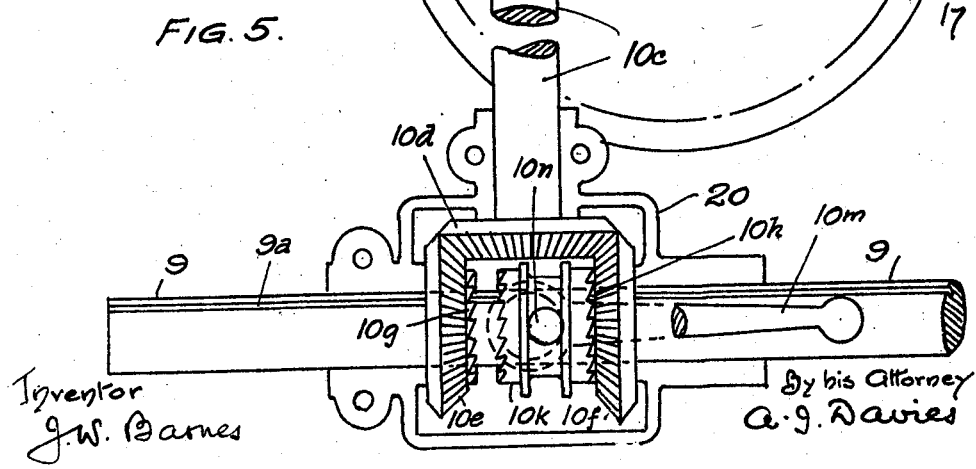

Patented Dec. 23, 1924.

1,520,219

UNITED STATES PATENT OFFICE.

JOHN WILLIAM BARNES, OF ROCK FERRY, ENGLAND.

APPARATUS FOR CUTTING INCLINED KEYWAYS IN SHAFTS OR LIKE OPERATIONS.

Application filed July 2, 1921. Serial No. 482,249.

*To all whom it may concern:*

Be it known that I, JOHN WILLIAM BARNES, a subject of the King of Great Britain, and a resident of Railway Works, Railway Road, Rock Ferry, England, have invented certain new and useful Improvements in Apparatus for Cutting Inclined Keyways in Shafts or like Operations, of which the following is a specification.

This invention relates to apparatus for scarfing plates, cutting inclined keyways in shafts or the like operations. The invention is an improvement of that described in my Patent No. 1,392,549, dated Oct. 4, 1921, and is directed to certain modifications of that invention whereby the construction of the apparatus is rendered more simple.

According to this invention, the spindle of the cutter is interconnected with the traversing feed mechanism of the cutter whereby the rotary drive of the cutter also effects its traversing movement, means being provided for reversing the direction of the traverse.

The invention is illustrated in the accompanying drawings in which Fig. 1 is an end view and Fig. 2 a plan of the apparatus. Fig. 3 is a detail view showing the gearing between the connecting shaft and the control shaft. Fig. 4 is a fragmentary elevation partly in section, and Fig. 5 is an end view, showing the clutch mechanism and the means by which the connecting shaft is driven from the cutter spindle.

In carrying out the invention the apparatus consists of a bed plate 1 on which is directly secured the main horizontal guide 2 by bolts 3 which pass through curved slots 4 in the guide so that the latter may be adjusted angularly on the bed plate 1 relatively to the work, such as the shaft 5, in which the inclined or other keyway is to be cut, the work being suitably carried on the bed plate. The main guide 2 carries a traversing feed screw 6 interconnected by a chain and sprocket drive 7 with a traversing control shaft 8, the latter being geared to a connecting shaft 9 which is driven from the spindle 10 of the cutter 11 in such manner that the shaft 9 permits of the necessary vertical adjusting movement of the housing 17 of the spindle 10. This cutter spindle is driven from the motor 12 by way of the worm 13 engaging a worm wheel 13$^a$ on the end of the cutter spindle, so that as the spindle 10 is rotated the traversing feed screw 6 also rotates and carries along the slide 14 with which the screw 6 engages, the slide 14 moving on the guide 2. This slide 14 is fitted with a secondary transverse slide 15 carrying the pillar bracket 16, on which is mounted to slide vertically the housing 17 of the milling cutter spindle 10, this housing also carrying a bracket 18 to which the motor 12 is bolted. The housing 17 is adjustable vertically on the pillar bracket 16 and relatively to the bed plate 1 by the screw 19. The connecting shaft 9 is provided with a clutch mechanism 20, for varying the direction of rotation of the traverse control shaft 8 and feed screw 6, whereby the cutter 11 may be moved to and fro along the work 5. The cutter spindle 10, Fig. 4, on which is the worm wheel 13$^a$ in the housing 17, drives through a worm 10$^a$ on the spindle a worm wheel 10$^b$ on a short shaft 10$^c$. This shaft carries a bevel gear 10$^d$ permanently in mesh with two other bevel gears 10$^e$, 10$^f$ loose on the connecting shaft 9, which latter has a keyway 9$^a$ throughout its length. On the opposing faces of the loose bevels 10$^e$, 10$^f$, are toothed clutch elements 10$^g$, 10$^h$, and mounted between the bevels 10$^e$, 10$^f$ is a clutch member 10$^k$ which is slidable on the shaft 9 but keyed rotatively thereto by a feather engaging the keyway 9$^a$. The outer faces of the clutch member 10$^k$ are toothed so that such member may be caused to engage with either of the bevels 10$^e$, 10$^f$, by turning the handle 10$^m$ of the clutch to which is connected an eccentric pin 10$^n$ engaging a race in the clutch member. Consequently, by turning the handle 10$^m$ either of the bevels 10$^e$, 10$^f$ may be clutched to the shaft 9 and the direction of rotation of that shaft reversed. Owing to the continuous keyway 9$^a$ formed in it, the shaft 9 may slide through the clutch, consequently also the housing 17 may be vertically adjusted without interfering with the drive from the cutter spindle 10 to the connecting shaft 9. This shaft 9 drives the control shaft 8 by means of a bevel gear wheel 9$^b$ on the connecting shaft engaging a bevel 8$^a$ on a control shaft. The control shaft is also provided with a continuous keyway 8$^b$ and the bevel 8$^a$ is feathered to engage such keyway. The bevels 8$^a$, 9$^b$, are mounted in a gear box 8$^c$ and, consequently, the control shaft 8 is driven from the connecting shaft 9 at any position as the gear box 8ᶜ slides along such shaft 8.

The work, such as a shaft or the like, in which the keyway is to be cut is supported in a V-socket or other bracket 21 bolted on the bed plate 1, the height of the cutter spindle 10 being adjusted on the pillar bracket 16 by the screw 19 in order to bring the cutter to the requisite position and the main guide 2 then set parallel to the axis of the shaft 5, if a parallel keyway is to be cut, or angularly inclined to the axis of the shaft as shown in Fig. 2, if an inclined keyway is to be cut. By means of the secondary slide 15 the cutter is brought up to the work and the requisite depth of cut obtained by adjustment of the screw 15ᵃ. As the connection of the shaft 9 to the shaft 8 permits of the shaft 9 moving angularly about the shaft 8 and as the shaft 9 is slidable longitudinally through the clutch mechanism 20, the housing 17 may be moved freely up or down the pillar 16 without affecting the drive from the spindle 10 to the shaft 8.

Such an arrangement provides an extremely simple form of the machine by eliminating the bracket on the bed plate, while such apparatus may be readily converted to the bracket type by bolting a detachable bracket to the bed plate from which the milling cutter and its driving mechanism may be carried.

I claim:

A machine for scarfing plates, cutting inclined keyways and the like comprising, a bed plate to which the work is clamped, a guide angularly adjustable on the bed plate, means for driving the milling cutter, a feed screw for traversing the milling attachment on the guide, a control shaft on the guide geared to the feed screw, a slide adjustable at right angles to the traversing movement of the guide, a milling attachment adjustable vertically on the slide, a connecting shaft gearing the control shaft to the milling cutter spindle, said connecting shaft having a continuous keyway and engaging rotatively but slidably with a reversing clutch member on the shaft whereby the direction of rotation of the feed screw is controlled, the slidable engagement of the connecting shaft with the clutch member permitting vertical adjustment of the milling cutter while running.

In testimony whereof I affix my signature in presence of two witnesses.

JOHN WILLIAM BARNES.

Witnesses:
E. HEGINBOTHAM,
A. J. DAVIES.